June 11, 1940.                    H. SHORE                    2,203,882
                           PHOTOAMPLIFIER SYSTEM
                           Filed Dec. 28, 1934
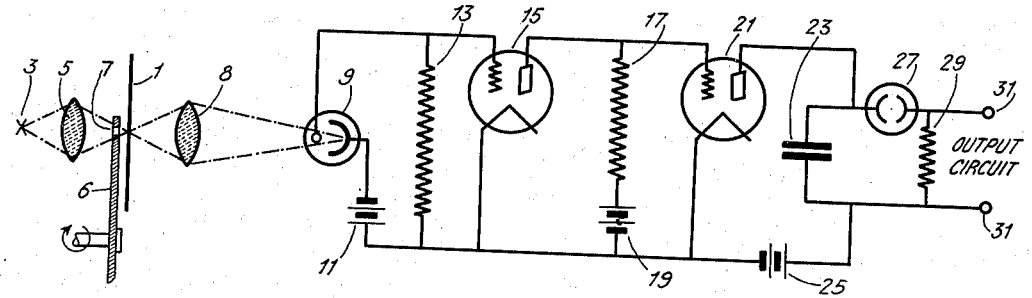
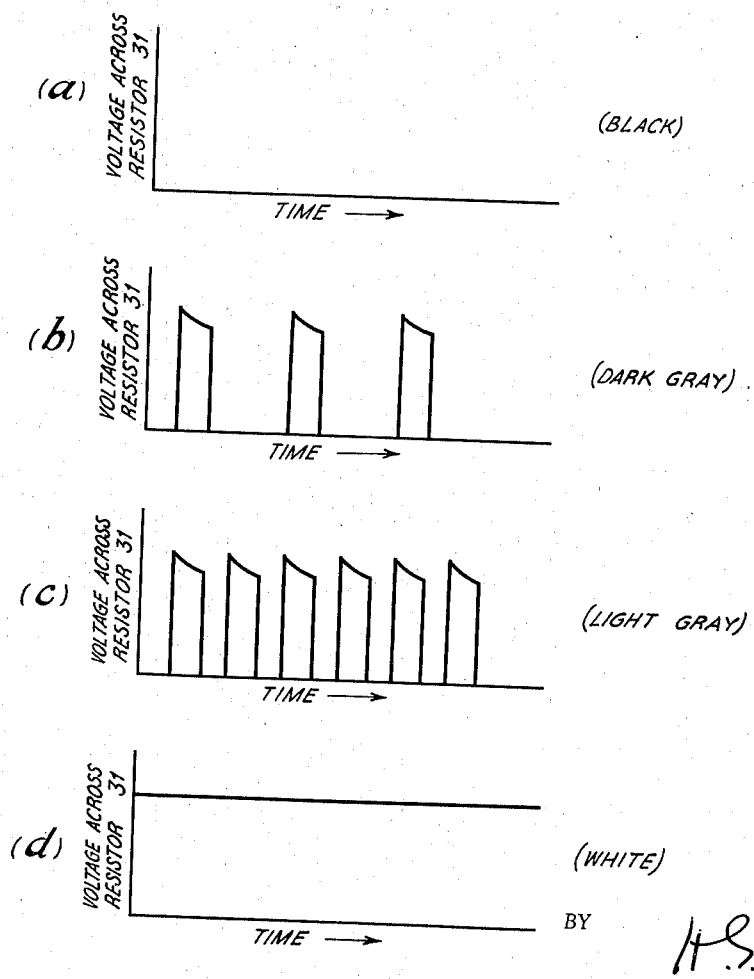
INVENTOR.
HENRY SHORE
BY
ATTORNEY.

Patented June 11, 1940

2,203,882

UNITED STATES PATENT OFFICE 2,203,882

PHOTOAMPLIFIER SYSTEM

Henry Shore, Elizabeth, N. J., assignor to Radio Corporation of America, a corporation of Delaware Application December 28, 1934, Serial No. 759,497

4 Claims. (Cl. 178—7.1)

This invention relates to photoamplifying systems and particularly to photoamplifying systems for use in connection with picture transmitting apparatus.

Broadly speaking, the invention is directed to a method and apparatus for transforming the light intensities upon elemental areas of a picture record into a series of dots and long dashes.

The invention has for its primary object that of providing a method and system for amplifying photoelectric currents or any other type of controlling impulse currents and for producing from these currents output signals which can be supplied to a transmission channel wherein different characters of impressed signals will be represented by impulses of predetermined durations or by continuing signals.

Other objects and advantages of the invention are to provide a system for transmitting intelligence, and particularly for use in connection with picture transmission apparatus which will be efficient in operation, easy to construct and install, and which may be operated with a minimum amount of difficulty.

Other objects and advantages of the invention will become apparent and suggest themselves to those skilled in the art to which the invention is directed, by reading the following specification and claims in connection with the accompanying drawing.

The invention in one of its preferred forms has been illustrated by the drawing accompanying this specification. By the drawing Fig. 1 represents schematically one form of circuit arrangement for carrying out the aims and objects of the invention, and Fig. 2 is a graphical analysis of the operation of the system disclosed by Fig. 1 wherein the several curves thereof indicate the output voltages from the system plotted against time. In Fig. 2 varying conditions of transmission represented for example by black (opacity), dark gray, light gray, and white (transparency) of the record surface, assuming the record from which the signals to control the system are produced to be a film, are shown by the several curves a, b, c, and d respectively.

Referring now to the drawing, it can be seen that the film 1, of which an electro-optical representation is to be produced at a distant point, is illuminated by light from a source 3, preferably of constant intensity, directed upon the film subject 1 by means of a suitable optical system 5. Interposed between the optical system 5 and the film subject 1 is a scanning device 6 adapted to rotate for example in the direction shown by the arrow and provided by a series of apertures 7 arranged about the periphery thereof so that as the film 1 is moved in the direction shown by the arrow, and as the disc or scanning element 6 rotates, the beam of light from the source 3 is adapted to traverse the film subject 1 along a series of transverse paths each of elemental width. The transparencies of the picture subject or film 1 control the light passing through the optical system 3 to influence a light translating element 10 such as the photoelectric cell 9. Connected with the photoelectric cell 9 there is provided a battery 11 for supplying suitable voltages to the electrodes of the cell, and in series with this voltage source and the cell electrodes there is provided the usual resistance element 13 so that as light influences the photoelectric cell 9 varying currents flow therethrough and varying voltage drops take place through the resistor 13. An amplifying tube 15 has its input circuit connected across the end terminals of the resistor 13 so that as varying voltage drops take place through the resistor, varying potentials are applied to the input or grid electrode of the tube relative to the emitting cathode. The system is so constructed that in the absence of light reaching the photoelectric cell 9 the control electrode of the tube 15 is maintained at a positive voltage and hence the tube 15 draws current through the resistor 17 connected in its output circuit and through the battery 19 in series with the resistor 17 and the tube cathode. Directly coupled with the tube 15 is a second amplifying tube 21 which has its input circuit connected between the terminal of the resistor 17 nearest the output or plate electrode of the tube 15 and to the negative terminal of the battery 19 and also with the cathode of the tube 15 so that as the tube 15 draws current (still assuming an absence of light upon the photoelectric cell 9) a voltage drop takes place across the resistor 17 and the control electrode or grid of the tube 21 receives a negative bias.

It can readily be seen that by using suitable constants for the various circuits thus far described the negative potential applied to the grid or control electrode of the tube 15 can be maintained at such a value as to correspond to at least a cut-off value for the tube and also the negative potential applied to the grid or control electrode of the tube 21 at times when the tube 15 draws current may be of such a value as to correspond at least to the cut-off value for this tube. Connected in the output circuit of the tube 21 there is provided a condenser element 23 in series with a voltage supply source or battery 25 so that during time periods of blackness or an absence of light upon the photoelectric cell 9 which causes the control electrode of the tube 21 to assume a cut-off value the condenser 23 cannot be charged from the battery 25 and consequently there is no output. However, when light falls upon the photoelectric cell and influences the photoelectric cell proportionately to the varying intensities of light and shadow upon the elemental area of the film record 1 illuminated by the source 3, the output current from the tube 15 ceases and the tube 21 commences to draw current so that the condenser 23 charges. The condenser 23 can then be discharged when it assumes a voltage equal to the break-down voltage of the glow discharge tube 27 connected in parallel therewith. This charge and discharge of the condenser 23 thus takes place periodically and is determined by the light reaching the photocell 9. It can readily be seen that as the intensity of the light on the photocell increases the frequency increases until the grid or control electrode of the second tube 21 reaches a positive potential sufficient to cause a "locking" in the circuit, in which event the output voltage as obtained across the terminal points 31, which are in turn connected across the resistor element 29, becomes practically constant. The durations of the impulse obtained is naturally a function of the value of the resistor, the condenser and the voltage drop taking place through the glow discharge tube.

From the curves supplied as a part of Fig. 2 of the drawing, it can be seen that for a condition of black there will be no voltage across the resistor 31 and that as the conditions change from black in the direction of white, there will be impulses spaced first at relatively wide distances for dark gray and closer together for light gray, and that as a condition of white is approached there will be a substantially steady voltage. Also, it can readily be seen that for conditions of white or high light on the photoelectric cell 9 steady voltage will be obtained if the time required to charge the condenser 23 is equal to or less than the time for it to discharge through the glow tube 27. Thus it can be seen that the system herein disclosed provides a combination of a photoelectric cell, a plurality of electronic tubes in combination with an electric storage device and a means through which it may be discharged which will produce in an output circuit outputs which are proportional in time duration to the light intensity influencing the photoelectric cell.

As a modification of the use to which this invention may be put it will be appreciated that the system as disclosed finds application in counting systems or in systems for measuring the brilliancy of some illuminating light source. For example, if it is desired to measure the brilliance of the sun over some particular time period, and an indicating device is connected in the output circuit of the device across the terminals 31, it can be seen that the indication produced in the indicating device will be different for time periods, for example, when the sun is shining with full brilliance upon the photoelectric cell and for time periods when, for example, the sun passes behind a cloud. Under such conditions the current flowing into the condenser times the time during which it flows will be equal to the charge on the condenser and this will in turn be equal to a constant value so that the relationship may be expressed as $q=i$. $t=K$ where $q=$ the charge, $i$ the current, $t$ the time, and $K$ a constant. It will be appreciated that when operating for this purpose the system serves as an integrating device and in this particular suggested application of the system the input level is so adjusted that the equipment is never so operated as to give a constant output level across the terminals 31 but rather to cause a series of impulses, for example as shown by the curve drawn to represent conditions of light gray although the impulses could be closer together. Furthermore, it is unnecessary to utilize as the control means a photocell as illustrated. Any appropriate controlling signal may be applied to the input circuit of the first amplifying tube without departing from the spirit and scope of this disclosure.

It is of course obvious that still other modifications of the invention may be made without departing from the spirit and scope thereof, and therefore such changes are to be considered as falling within the scope of this disclosure in so far as they fall fairly within the spirit and scope thereof as defined by the hereinafter appended claims wherein what is claimed and desired to be secured by Letters Patent is the following:

1. The method of transmitting intelligence, which comprises the steps of converting variations in light intensities into variations in amplitudes of direct current, amplifying the direct current, storing electrical energy up to a predetermined value at a rate proportional to the amplitude of the amplified direct current, dissipating the stored energy in a constant fixed predetermined time interval when the stored energy reaches the said predetermined value, selecting signalling impulses of constant duration from the dissipated energy, and spacing the impulses variably in time proportional to the variations in light intensities.

2. An amplifying system comprising a plurality of direct connected thermionic tubes, means for controlling the current flowing through one of said tubes and thereby controlling the current flowing through the other of said tubes in an opposite sense, an electric storage device connected in the output circuit of the second of said tubes and charged in accordance with the current flowing in said second tube, and a gaseous discharge device directly connected in series with a resistance, said serially connected condenser and resistance being connected in parallel with the said storage device for discharging the storage device in a constant predetermined time interval whenever the charge reaches a fixed predetermined value.

3. A photocell amplifier system comprising a photoelectric cell and means for sequentially subjecting the cell to varying intensities of light and shadow to control the current output therefrom, a thermionic tube having its input circuit connected to the output circuit of the said photoelectric cell so that the current flowing through said thermionic tube varies in accordance with the instantaneous light intensity upon the said photoelectric cell, a second thermionic tube connected with the output circuit of said first thermionic tube and having the current flowing therethrough controlled in an opposite sense to the current flowing through the said first tube, and a parallel combination comprising a storage condenser and a serially connected resistance and a gaseous discharge tube for discharging the storage condenser in a constant predetermined time interval whenever the charge reaches a fixed predetermined value connected in the output circuit of said second tube and means also connected in the output circuit of the second tube for charging the said condenser through the said second tube, and an output circuit connected between said gaseous discharge tube and said source of energy whereby impulses spaced in time proportional to the output energy from the said second tube as controlled by the light intensity incident upon the photoelectric cell are produced in said output circuit.

4. An intelligence transmitting system comprising means for converting variations in light intensities into variations in amplitudes of direct current, means for amplifying the direct current, means for storing electrical energy up to a predetermined value at a rate proportional to the amplitude of the amplified direct current, means for dissipating the stored energy in a constant fixed predetermined time interval when the stored energy reaches the said predetermined value, means for selecting signalling impulses of constant duration from the dissipated energy, and means for spacing the impulses variably in time proportional to the variations in light intensities.

HENRY SHORE.